US012663221B1

(12) United States Patent
Elamin et al.

(10) Patent No.: US 12,663,221 B1
(45) Date of Patent: Jun. 23, 2026

(54) DEVICE AND METHOD FOR MEASURING THERMAL CHARGING STATE IN LATENT HEAT THERMAL ENERGY STORAGE SYSTEMS

(71) Applicant: PRINCE SATTAM BIN ABDULAZIZ UNIVERSITY, Al-Kharj (SA)

(72) Inventors: Obai Younis Taha Elamin, Al-Kharj (SA); Jana Shafi, Al-Kharj (SA); Mohammad Ghalambaz, Tomsk (RU); Pouyan Talebizadehsardari, Nottingham (GB)

(73) Assignee: PRINCE SATTAM BIN ABDULAZIZ UNIVERSITY, Al-Kharj (SA)

( * ) Notice: Subject to any disclaimer, the term of this patent is extended or adjusted under 35 U.S.C. 154(b) by 0 days.

(21) Appl. No.: 19/337,695

(22) Filed: Sep. 23, 2025

(51) Int. Cl.
*F28D 20/02* (2006.01)
*G01K 7/22* (2006.01)
*G01N 25/18* (2006.01)

(52) U.S. Cl.
CPC ............. *F28D 20/028* (2013.01); *G01K 7/22* (2013.01); *G01N 25/18* (2013.01)

(58) Field of Classification Search
CPC ......... F28D 20/028; G01K 7/22; G01N 25/18
See application file for complete search history.

(56) References Cited

U.S. PATENT DOCUMENTS

| | | |
|---|---|---|
| 2017/0038093 A1 | 2/2017 | Launay |
| 2019/0137190 A1* | 5/2019 | Novoselac .............. F28D 20/02 |
| 2020/0259225 A1* | 8/2020 | Singer ................. H01M 10/615 |
| 2022/0316772 A1* | 10/2022 | Wu ...................... F28D 20/028 |
| 2024/0035717 A1 | 2/2024 | Zou et al. |
| 2024/0356376 A1 | 10/2024 | Zeine et al. |

FOREIGN PATENT DOCUMENTS

EP          3336473 A1     6/2018

* cited by examiner

*Primary Examiner* — Ricky Go
(74) *Attorney, Agent, or Firm* — Oblon, McClelland, Maier & Neustadt, L.L.P.

(57) ABSTRACT

A device and a method for measuring a thermal charging state in a latent heat thermal energy storage (LHTES) system are provided. The device includes an energy storage unit with a phase change material (PCM) and one or more thermistor wires disposed along the length of the PCM. A control circuit is electrically connected to the thermistor wires. The control circuit passes an electric current through the one or more thermistor wires and measures the resulting resistance change. A processor, in communication with the control circuit, is configured to determine the thermal charging state of the PCM based on the measured resistance change. This configuration allows for an integrated thermal measurement along the entire length of the PCM to provide an accurate assessment of the stored energy.

20 Claims, 7 Drawing Sheets

DEVICE AND METHOD FOR MEASURING THERMAL CHARGING STATE IN LATENT HEAT THERMAL ENERGY STORAGE SYSTEMS

BACKGROUND

Technical Field

The present disclosure relates to thermal energy storage systems, and more specifically to methods and devices for measuring thermal charging states in latent heat thermal energy storage systems.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Latent heat thermal energy storage systems have become increasingly important for energy management applications. These systems utilize phase change materials to store and release thermal energy during phase transitions between solid and liquid states. The phase change materials provide high energy density storage capability while maintaining relatively constant temperature during the phase transition process. Phase change materials operate by absorbing latent heat during melting transitions and releasing latent heat during solidification transitions, enabling efficient thermal energy storage with minimal temperature variation.

Existing methods for determining the charging state of latent heat thermal energy storage systems often rely on temperature sensors or visual imaging, and face significant limitations in accuracy and reliability. Temperature sensors alone struggle to detect the complex phase transitions within the system, especially in the mushy zone where both liquid and solid phases coexist. The mushy zone presents particular challenges because traditional temperature measurement techniques cannot accurately distinguish between the different phases present simultaneously in the phase change material. Visual imaging methods that compromise insulation are difficult to implement in practical applications due to space limitations and the need to maintain thermal integrity of the storage system.

Conventional solutions for monitoring thermal charging states include multiple temperature sensor arrays positioned throughout the phase change material domain. These sensor arrays attempt to provide spatial temperature distribution data for estimating the overall charging state of the system. Some approaches utilize computational models that combine limited sensor data with mathematical algorithms to estimate the state of charge. State-of-charge estimation methods using nonlinear state observers have been developed that track transient spatial temperature fields within the storage using as few as four internal phase change material temperature sensors. Artificial intelligence techniques, such as recurrent neural networks, have been explored for latent heat thermal energy storage state-of-charge estimation to reduce computational costs while maintaining high accuracy.

These known solutions demonstrate several limitations that restrict their practical implementation. Multiple temperature sensor installations increase system complexity and cost while providing only discrete point measurements rather than continuous spatial information. The reliance on multiple temperature sensors increases instrumentation complexity and costs. Computational approaches often require significant processing resources and may not provide real-time results suitable for dynamic control applications. The discrete nature of conventional measurement approaches fails to capture the continuous spatial variations in thermal charging state that occur throughout the phase change material domain. Existing approaches do not focus on real-time measurement of the phase change or the thermal charging state, which presents challenges for accurate monitoring and control of latent heat thermal energy storage systems.

US20170038093A1 describes a device for quantifying useful thermal energy in a storage tank. The device includes multiple thermoelectric converters distributed at various locations within the tank, an electric circuit connecting the converters, a device for measuring a single electrical variable of the circuit, and means for converting this measurement into a value for the available useful thermal energy. In some configurations, the thermoelectric converter includes a thermistor, and a constant electric current can be injected into the electric circuit to measure a voltage, from which the useful heat available in the tank is quantified. However, this reference does not describe a device that determines a thermal charging state by using a continuous thermistor wire that also functions as a heat source to measure a resistance-time series dataset reflecting the thermal conductivity of a phase change material.

US20240035717A1 describes a heat pump with a thermal energy storage (TES) material. The system includes a controller that communicates with various sensors, including a TES temperature sensor, to monitor and control the heat pump's operation. The TES temperature sensor, which can be a thermistor, detects the temperature of the TES material to determine if it is in a charged or discharged state, with higher temperatures indicating a liquid phase (charged) and lower temperatures indicating a solid phase (discharged). However, this reference does not describe a device that determines a thermal charging state by using a continuous thermistor wire that also functions as a heat source to measure a resistance-time series dataset reflecting the thermal conductivity of a phase change material.

EP3336473A1 describes a method for determining a state of charge of a latent heat storage device containing a phase change material (PCM). The method involves measuring the temperature at a minimum of two positions within the latent heat storage device using temperature sensors. A computing unit then calculates a temperature field within the PCM based on the measured temperatures and determines the state of charge based on this calculated temperature field. However, this reference does not describe a device that determines a thermal charging state by using a continuous thermistor wire that also functions as a heat source to measure a resistance-time series dataset reflecting the thermal conductivity of a phase change material.

Each of the aforementioned references suffers from one or more drawbacks hindering their adoption, such as relying on discrete point-based temperature measurements which may not accurately represent the overall state of a non-uniform phase transition, or focusing on temperature alone without directly measuring the thermal properties that change during the phase transition. These approaches can lead to inaccuracies in determining the true charging state, especially within the mushy zone where both solid and liquid phases of the PCM coexist. Accordingly, it is one object of the present disclosure to provide a device and method that measures thermal charging states in latent heat thermal energy storage systems, and provides continuous spatial measurement capability and real-time data suitable for control applications.

SUMMARY

In an aspect, a device for measuring a thermal charging state in a latent heat thermal energy storage system includes an energy storage unit comprising a phase change material, one or more thermistor wires, each disposed along a length of the phase change material, a control circuit electrically connected to the one or more thermistor wires to pass an electric current to the one or more thermistor wires and measure a resistance change of the one or more thermistor wires during passage of the electric current, and a processor in communication with the control circuit configured to determine a thermal charging state of the phase change material based on at least the measured resistance change of the one or more thermistor wires.

In some embodiments, the resistance change is measured as a resistance-time series dataset, and the processor is further configured to determine the thermal charging state using the resistance-time series dataset.

In some embodiments, the processor is configured to compute the thermal charging state of the phase change material by analyzing a relationship between the measured resistance change and a temperature of the one or more thermistor wires using a thermistor calibration equation.

In some embodiments, the processor is configured to compute the thermal charging state of the phase change material using a Steinhart-Hart equation:

$$\frac{1}{T} = a + b \cdot \ln(R) + c \cdot \ln\left(R^3\right)$$

where T is a temperature determined from a resistance R of the one or more thermistor wires, and a, b, and c are thermistor material-specific coefficients.

In some embodiments, the processor is configured to estimate a thermal conductivity of the phase change material based on the measured resistance change of the one or more thermistor wires over a selected time and a corresponding temperature change.

In some embodiments, the processor is configured to compute a charging percentage of the energy storage unit by comparing the measured resistance change to a plurality of stored reference resistance change values for a solid and a liquid phase change material state.

In some embodiments, the processor is configured to compute an overcharged or over-discharged state of the energy storage unit by computing an average phase change material temperature based on a linear relationship between the measured resistance change and a temperature of the one or more thermistor wires.

In some embodiments, the processor is configured to estimate a stored sensible heat in the phase change material based on a temperature of the one or more thermistor wires and one or more phase change material properties.

In some embodiments, the device further includes a pair of conductive rings provided at opposite ends of the phase change material, wherein the one or more thermistor wires is linearly connected between the pair of conductive rings.

In some embodiments, the one or more thermistor wires has a diameter between 1 mm and 2 mm.

In some embodiments, the control circuit is configured to pass an electric current of less than 1A through the one or more thermistor wires to generate heat.

In some embodiments, the processor is configured to compute the thermal charging state of the phase change material by analyzing a relationship between the measured resistance change and temperature of the one or more thermistor wires over a period of up to 120 seconds.

In an aspect, a method of measuring a thermal charging state in a latent heat thermal energy storage system includes providing an energy storage unit comprising a phase change material and one or more thermistor wires, each disposed along a length of the phase change material, passing a controlled electric current to the one or more thermistor wires to generate heat along a length of the one or more thermistor wires, measuring a resistance change of the one or more thermistor wires during the passing of the electric current, and transmitting data including the measured resistance change to a processor to determine a thermal charging state of the phase change material.

In some embodiments, the method further includes measuring the resistance change as a resistance-time series dataset and computing the thermal charging state using the resistance-time series dataset.

In some embodiments, computing the thermal charging state comprises calculating a temperature (T) of the one or more thermistor wires using a Steinhart-Hart equation based on the measured resistance (R) of the one or more thermistor wires, wherein $$\frac{1}{T} = a + b \cdot \ln(R) + c \cdot \ln\left(R^3\right)$$

where a, b, and c are thermistor material-specific coefficients

In some embodiments, the method further includes calculating a thermal conductivity (k) of the phase change material using Fourier's Law of heat conduction, wherein a temperature change ($\Delta T$) is modeled as being proportional to a natural logarithm of elapsed time ($\ln(t)$), as determined from the measured resistance change of the one or more thermistor wires.

In some embodiments, the method further includes computing an overcharged or over-discharged state of the energy storage unit by computing an average phase change material temperature (T) based on a linear relationship between the measured resistance change and temperature of the one or more thermistor wires, wherein:

$$T = T_1 + \left(\frac{R - R_1}{R_2 - R_1}\right) x (T_2 - T_1)$$

where $R_1$ and $R_2$ are resistances at known temperatures $T_1$ and $T_2$, respectively.

In some embodiments, the method further includes estimating a stored sensible heat in the phase change material using a specific heat formula:

$$Q = m \cdot C_p \cdot (T - T_m)$$

where Q is the heat added, m is a mass of the PCM, $C_p$ is a specific heat capacity of a liquid PCM, T is an average PCM temperature, and $T_m$ is a melting temperature of the PCM.

In some embodiments, the method further includes computing a charging percentage (P) of the energy storage unit using a comparison of the measured resistance change with a plurality of stored reference resistance change values for a solid and a liquid phase change material states.

In some embodiments, the method further includes computing the thermal charging state based on a stored dataset of experimental resistance-time values for calibration.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
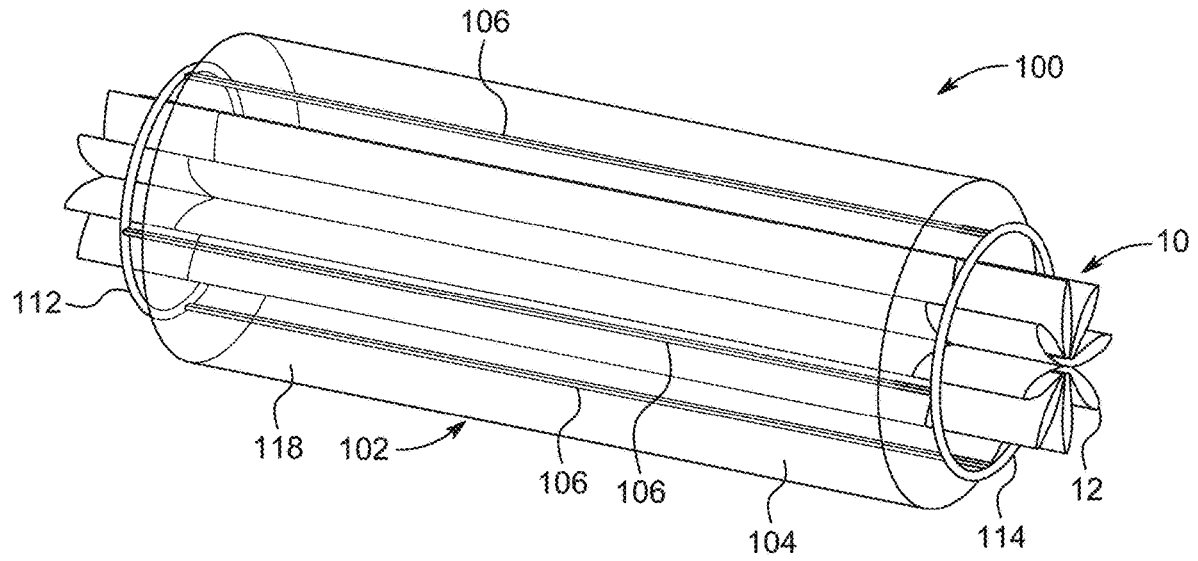
FIG. 1A is a perspective view illustrating internal components of a device for measuring thermal charging state in a latent heat thermal energy storage (LHTES) system, according to certain embodiments.

In the drawings, like reference numerals designate identical or corresponding parts throughout the several views. Further, as used herein, the words "a", "an" and the like generally carry a meaning of "one or more", unless stated otherwise.

Furthermore, the terms "approximately," "approximate", "about" and similar terms generally refer to ranges that include the identified value within a margin of 20%, 10%, or preferably 5%, and any values therebetween.

Aspects of this disclosure are directed to a device and a method for measuring a thermal charging state in a latent heat thermal energy storage system. The device and the method of the present disclosure utilize one or more thermistor wires disposed within a phase change material to provide continuous spatial measurement of thermal charging conditions throughout the latent heat thermal energy storage system. The measurement approach is based on Fourier's Law of Heat Conduction and the impact of the temperature field on the electrical resistance of a linear thermistor wire. The device replaces traditional arrays of temperature sensors with a continuous thermistor wire approach that provides integrated measurement across the entire phase change material domain. The disclosure is applicable in various industries that utilize phase change materials for energy storage, including renewable energy systems, building energy management, and industrial heat recovery.

Figure 1B:
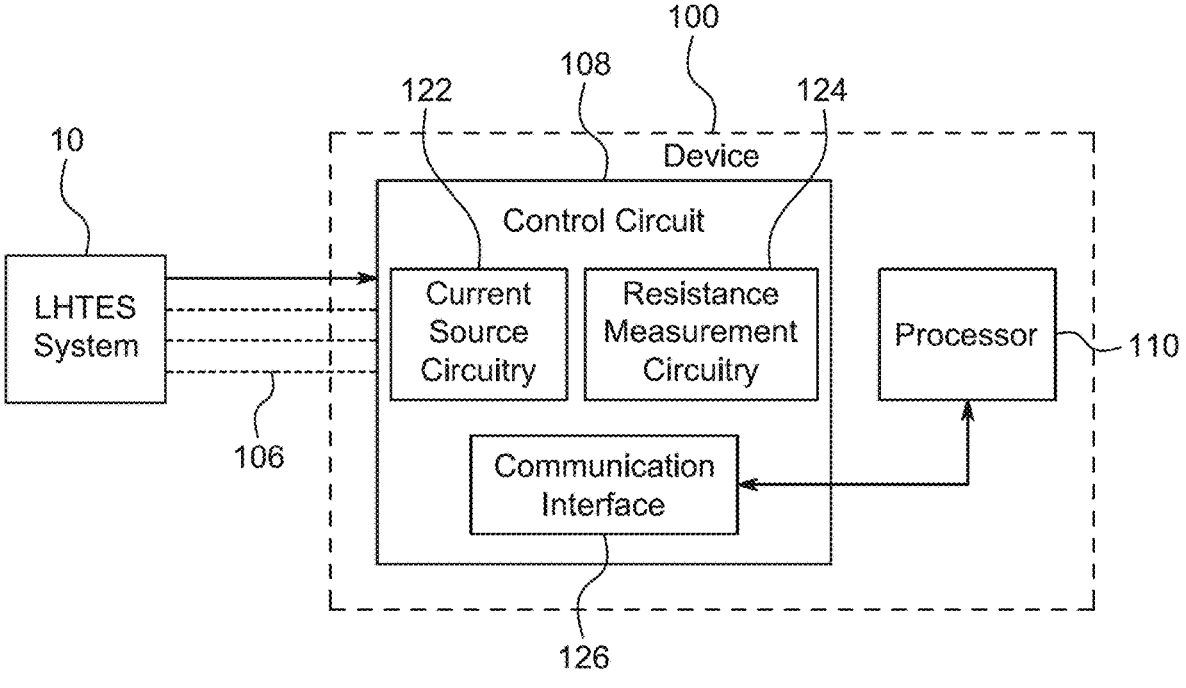
FIG. 1B is a schematic block diagram of the device for measuring thermal charging state in the LHTES system, according to certain embodiments.

Referring to FIGS. 1A and 1B in combination, illustrated are views of a device for measuring a thermal charging state (as represented by reference numeral 100, and hereinafter referred to as "device 100") in a latent heat thermal energy storage (LHTES) system 10. It may be noted that the LHTES system 10 operates by storing and releasing thermal energy through phase transitions of a phase change material between solid and liquid states. As shown in FIG. 1A, the LHTES system 10 incorporates heat transfer fluid channels 12 that direct the flow of heat transfer fluid therein, during charging or discharging operations. The device 100 of the present disclosure provides real-time monitoring of the thermal charging state of the LHTES system 10 through continuous measurement of thermal conditions therein. The device 100 enables accurate detection of phase changes and charging percentages with minimal impact on system insulation and performance of the LHTES system 10.

As illustrated in FIG. 1A, the device 100 includes an energy storage unit 102 comprising a phase change material (PCM) 104. The energy storage unit 102 forms the primary thermal storage component of the LHTES system 10 and contains the PCM 104 within a controlled environment suitable for thermal energy storage operations. The energy storage unit 102 includes a housing structure 118 that maintains the PCM 104 in proper configuration for thermal charging and discharging operations while providing access for measurement components. The energy storage unit 102 is designed to facilitate heat transfer between external heat sources or sinks and the PCM 104 during charging and discharging cycles. Herein, the housing structure 118 provides insulation and structural support for the PCM 104 while maintaining the integrity of the thermal storage system. The energy storage unit 102 operates as a contained thermal storage system that enables controlled phase change processes within the PCM 104.

The PCM 104 within the energy storage unit 102 stores thermal energy through latent heat absorption and release during phase transitions between solid and liquid states. The PCM 104 exhibits characteristic melting and solidification temperatures that define the operating range of the LHTES system 10. During charging operations, thermal energy input causes the PCM 104 to transition from solid to liquid state while absorbing latent heat at approximately constant temperature. During discharging operations, the PCM 104 transitions from liquid to solid state while releasing stored latent heat at approximately constant temperature. In one or more examples, the PCM 104 may include materials such as paraffin wax, salt hydrates, fatty acids, or other suitable phase change materials selected based on the desired operating temperature range and thermal storage capacity requirements. The thermal properties of the PCM 104, including melting temperature, latent heat of fusion, thermal conductivity, and specific heat capacity, determine the performance characteristics of the energy storage unit 102. The PCM 104 undergoes phase transitions in a mushy zone where both liquid and solid phases coexist, making accurate state measurement challenging with conventional approaches.

The device 100 further includes one or more thermistor wires 106, each disposed along a length of the PCM 104. The one or more thermistor wires 106 extend through the PCM 104 to provide continuous spatial coverage for thermal measurement throughout the energy storage unit 102. Each thermistor wire 106 includes a temperature-sensitive resistive element that exhibits predictable resistance changes in response to temperature variations in the surrounding PCM 104. The resistance of the thermistor material varies with temperature according to well-established mathematical relationships that enable accurate temperature determination from resistance measurements. The one or more thermistor wires 106 are positioned to traverse substantially the entire length of the PCM 104, enabling measurement of thermal conditions across the complete spatial extent of the energy storage unit 102. The continuous nature of the one or more thermistor wires 106 provides integrated measurement capability that captures spatial variations in thermal charging state throughout the PCM 104. It may be noted that the one or more thermistor wires 106 serve dual functions as both heating elements for controlled thermal input and temperature sensors for measuring thermal response of the PCM 104.

In one or more embodiments, the one or more thermistor wires 106 has a diameter between 1 mm and 2 mm. The physical dimensions of the one or more thermistor wires 106 are selected to minimize intrusion into the PCM 104 while maintaining sufficient size for reliable electrical connections and thermal interaction. The given diameter range provides optimal balance between measurement sensitivity and minimal thermal disturbance to the PCM 104. The diameter specification ensures that the one or more thermistor wires 106 provide adequate current-carrying capacity for heat generation while minimizing the physical impact on PCM 104 behavior. The given diameter range also allows the one or more thermistor wires 106 to generate sufficient thermal energy for measurement purposes without significantly altering the natural thermal distribution within the PCM 104. It may be understood that the wire diameter affects both the electrical resistance and thermal mass of the one or more thermistor wires 106, influencing the sensitivity and response time of thermal measurements. The specified diameter range provides appropriate compromise between measurement accuracy and system integration requirements.

The device 100 further includes a pair of conductive rings 112, 114 provided at opposite ends of the PCM 104, wherein the one or more thermistor wires 106 is linearly connected between the pair of conductive rings 112, 114. Herein, the first conductive ring 112 is positioned at one end of the energy storage unit 102 and provides electrical connection to one terminal of the one or more thermistor wires 106. The second conductive ring 114 is positioned at the opposite end of the energy storage unit 102 and provides electrical connection to the other terminal of the one or more thermistor wires 106. The pair of conductive rings 112, 114 facilitate electrical current flow through the entire length of the one or more thermistor wires 106 while maintaining proper mechanical support and electrical contact. The conductive rings 112, 114 serve as electrical distribution hubs that transmit and collect electrical current through the one or more thermistor wires 106 embedded within the PCM 104. The linear connection between the pair of conductive rings 112, 114 ensures that electrical current flows uniformly along the entire length of the one or more thermistor wires 106, providing consistent heating and measurement capability throughout the PCM 104. For present purposes, the conductive rings 112, 114 may be constructed from materials with high electrical conductivity and corrosion resistance to ensure reliable electrical connections over extended operating periods.

Referring now to FIG. 1B, illustrated is a schematic block diagram of the device 100. As shown, the device 100 includes a control circuit 108 electrically connected to the one or more thermistor wires 106 to pass an electric current to the one or more thermistor wires 106 and measure a resistance change of the one or more thermistor wires 106 during passage of the electric current. The control circuit 108 provides both current delivery and resistance measurement functionality for the one or more thermistor wires 106 through integrated electrical systems. The control circuit 108 includes current source circuitry 122 that generates controlled electrical current for delivery to the one or more thermistor wires 106. The current source circuitry 122 provides control of electrical current magnitude and duration to ensure reproducible thermal input conditions for measurement purposes. The control circuit 108 also includes resistance measurement circuitry 124 that monitors the resistance of the one or more thermistor wires 106 during current application and detects resistance changes caused by temperature variations in the surrounding PCM 104. The resistance measurement circuitry 124 implements measurement techniques that can detect small resistance changes corresponding to thermal variations in the PCM 104. The control circuit 108 coordinates current application and resistance measurement operations to provide synchronized thermal input and response measurement for thermal charging state determination.

In the device 100, the control circuit 108 is configured to pass an electric current to the one or more thermistor wires 106 and measure a resistance change of the one or more thermistor wires 106 during passage of the electric current. In a particular embodiment, the control circuit 108 is configured to pass an electric current of less than 1A through the one or more thermistor wires 106 to generate heat. The current limitation ensures that the heat generation by the one or more thermistor wires 106 remains within acceptable levels that do not significantly disturb the natural thermal behavior of the PCM 104. The electric current generates Joule heating within the one or more thermistor wires 106, creating a controlled thermal input that interacts with the surrounding PCM 104. The heating power is given by the relationship $P=I^2R$, where I is the current and R is the resistance of the one or more thermistor wires 106. The resulting temperature changes in the PCM 104 cause corresponding resistance changes in the one or more thermistor wires 106 that can be measured and analyzed to determine thermal charging state information. The current limitation prevents excessive heating that could cause unwanted phase changes or thermal disturbances in the PCM 104. The controlled heat generation enables measurement of thermal response characteristics without compromising the integrity of the thermal storage system.

The device 100 further includes a processor 110 in communication with the control circuit 108 configured to determine a thermal charging state of the PCM 104 based on at least the measured resistance change of the one or more thermistor wires 106. The processor 110 receives resistance measurement data from the control circuit 108 through communication interface 126 and processes the data to extract thermal charging state information. Specifically, the processor 110 implements algorithms that correlate the measured resistance changes with thermal conditions in the PCM 104, including temperature distributions, phase change progress, and overall charging state.

Herein, the processor 110 may include a microprocessor, digital signal processor, microcontroller, or other computational device capable of implementing the required mathematical algorithms and data processing operations. Further, as shown in FIG. 1B, the processor 110 maintains communication with the control circuit 108 through the data communication interface 126 that enables bidirectional data transfer for control commands and measurement data. For present purposes, the processor 110 may store calibration data, implement mathematical models, and execute algorithm(s) for converting resistance measurements into thermal charging state information.

Specifically, in present embodiments, the resistance change is measured as a resistance-time series dataset, and the processor 110 is further configured to determine the thermal charging state using the resistance-time series dataset. The processor 110 continuously collects resistance measurements from the control circuit 108 over time to build a resistance-time series dataset that captures the temporal evolution of thermal conditions in the PCM 104. The resistance-time series dataset provides detailed information about the rate and progression of thermal changes within the PCM 104, enabling accurate determination of charging state and phase change dynamics. The processor 110 analyzes patterns and trends in the resistance-time series dataset to identify characteristic signatures associated with different thermal charging states and phase change conditions. The time series approach enables detection of transient thermal phenomena and provides higher accuracy than single-point measurements. The resistance-time series dataset enables the processor 110 to distinguish between different thermal charging states based on characteristic temporal response patterns that reflect the thermal properties and phase state of the PCM 104. The dataset collection over extended time periods provides statistical robustness and enables filtering of measurement noise through temporal averaging and trend analysis.

Further, in an embodiment, the processor 110 is configured to compute the thermal charging state of the PCM 104 by analyzing a relationship between the measured resistance change and a temperature of the one or more thermistor wires 106 using a thermistor calibration equation. The processor 110 implements mathematical relationships that convert resistance measurements into temperature values based on the known temperature-resistance characteristics of the thermistor material. The thermistor calibration equation accounts for the specific material properties and geometry of the one or more thermistor wires 106 to ensure accurate temperature determination across the operational temperature range. The processor 110 uses the temperature information derived from resistance measurements to assess the thermal state of the PCM 104 and determine the progress of phase change processes. The calibration equation enables compensation for nonlinear temperature-resistance relationships and material variations that affect measurement accuracy. For said purposes, the processor 110 may store calibration coefficients and implement computational algorithms that apply the thermistor calibration equation to resistance measurements in real-time during thermal charging state determination operations.

In one or more embodiments, the processor 110 is configured to compute the thermal charging state of the PCM 104 using a Steinhart-Hart equation:

$$\frac{1}{T} = a + b \cdot \ln(R) + c \cdot \ln(R^3)$$

where T is a temperature determined from a resistance R of the one or more thermistor wires 106; and a, b, and c are thermistor material-specific coefficients. The Steinhart-Hart equation provides a precise mathematical relationship between thermistor resistance and temperature that enables accurate temperature calculation from resistance measurements over wide temperature ranges. The processor 110 implements the Steinhart-Hart equation with the material-specific coefficients a, b, and c that characterize the temperature-resistance behavior of the particular thermistor material used in the one or more thermistor wires 106. The coefficients are determined through calibration procedures that measure the resistance-temperature relationship of the specific thermistor material under controlled conditions. The processor 110 may store the material-specific coefficients and implement the Steinhart-Hart equation computationally to provide real-time temperature calculation from resistance measurements. The Steinhart-Hart equation enables the processor 110 to convert resistance-time series data into corresponding temperature-time series data with high accuracy across the operational temperature range of the LHTES system 10. The equation provides superior accuracy compared to simpler linear or polynomial approximations, particularly over extended temperature ranges.

Further, in present embodiments, the processor 110 is configured to estimate a thermal conductivity of the PCM 104 based on the measured resistance change of the one or more thermistor wires 106 over a selected time and a corresponding temperature change. The processor 110 analyzes the thermal response of the PCM 104 to controlled heat input from the one or more thermistor wires 106 to determine thermal conductivity properties. Herein, the thermal conductivity estimation is based on Fourier's Law of Heat Conduction, which states that the heat transfer rate is proportional to the thermal conductivity, cross-sectional area, and temperature gradient. For the line heat source configuration, the heat transfer equation is adapted for cylindrical coordinates:

$$q' = -k \cdot 2\pi r \cdot \frac{dT}{dr}$$

where q' is the heat transfer rate per unit length, k is thermal conductivity of the PCM material, r is radial distance, and $$\frac{dT}{dr}$$

is the radial temperature gradient in a direction of the heat transfer. Further, the thermal conductivity estimation involves measuring the temperature rise in the PCM 104 following heat application and correlating the temperature response with known heat input rates using the relationship:

$$k = \frac{q' \ln(t)}{4\pi \Delta T}$$

where q' is heat input per unit length, t is time, and $\Delta T$ is temperature rise in the PCM. The processor 110 uses the thermal conductivity information to assess the phase state of the PCM 104, since thermal conductivity differs significantly between solid and liquid phases of most phase change materials.

In some embodiments, the processor 110 is configured to compute a charging percentage of the energy storage unit 102 by comparing the measured resistance change to a plurality of stored reference resistance change values for a solid and a liquid phase change material state. For this purpose, the processor 110 maintains calibration data that includes reference resistance change values corresponding to fully solid and fully liquid states of the PCM 104. The processor 110 compares current resistance measurements with the stored reference values to determine the relative position of the current state between the fully solid and fully liquid conditions. The charging percentage calculation uses the relationship:

$$P = \left| \frac{\Delta R_{measured} - \Delta R_{solid}}{\Delta R_{liquid} - \Delta R_{solid}} \right| \times 100$$

where P is the charging percentage of the LHTES system, $\Delta R_{measured}$ is the measured resistance change, $\Delta R_{solid}$ is the reference resistance change for solid phase change material, and $\Delta R_{liquid}$ is the reference resistance change for liquid phase change material. The charging percentage calculation provides a quantitative measure of the thermal charging state expressed as a percentage of total charging capacity of the energy storage unit 102. The processor 110 stores reference resistance values obtained through calibration measurements with known phase change material states and implements the charging percentage calculation in real-time during operation. The approach provides accuracy of approximately 10% for charging state determination based on the difference in thermal conductivity between solid and liquid phases of the PCM 104.

In some embodiments, the processor 110 is further configured to compute an overcharged or over-discharged state of the energy storage unit 102 by computing an average phase change material temperature based on a linear relationship between the measured resistance change and a temperature of the one or more thermistor wires 106. Herein, the processor 110 detects conditions where the PCM 104 temperature exceeds or falls below normal operating ranges associated with phase change transitions. Overcharged conditions occur when continued heat input raises the PCM 104 temperature above the melting point, resulting in sensible heat storage in the liquid phase. Over-discharged conditions occur when continued heat extraction lowers the PCM 104 temperature below the solidification point, resulting in sensible heat removal from the solid phase. The processor 110 calculates average temperature values using a linear relationship:

$$T = T_1 + \left( \frac{R - R_1}{R_2 - R_1} \right) \times (T_2 - T_1)$$

where T is the calculated temperature, R is the measured resistance, $R_1$ and $R_2$ are reference resistances at known temperatures $T_1$ and $T_1$. The linear relationship enables accurate temperature calculation from resistance measurements for quantifying the extent of overcharged or over-discharged conditions. The processor 110 uses the temperature information to determine when the energy storage unit 102 operates outside normal phase change temperature ranges and quantifies the degree of overcharge or over-discharge.

In some embodiments, the processor 110 is further configured to estimate a stored sensible heat in the PCM 104 based on a temperature of the one or more thermistor wires 106 and one or more PCM properties. Herein, the processor 110 calculates sensible heat content using temperature measurements and known thermal properties of the PCM 104, including specific heat capacity and mass. The sensible heat calculation uses the relationship:

$$Q = m \cdot c_p \cdot (T - T_m)$$

where Q is the stored sensible heat, m is the mass of the PCM 104, $c_p$ is the specific heat capacity, T is the average temperature, and $T_m$ is the melting temperature of the PCM 104. Sensible heat estimation enables the processor 110 to quantify thermal energy storage beyond the latent heat capacity associated with phase change transitions. The processor 110 accounts for sensible heat contributions during overcharged and over-discharged conditions to provide complete thermal energy accounting for the energy storage unit 102. The sensible heat calculation provides information about additional thermal energy storage capacity when the PCM 104 operates at temperatures above or below the normal phase change temperature range.

In some embodiments, the processor 110 is further configured to compute the thermal charging state of the PCM 104 by analyzing a relationship between the measured resistance change and temperature of the one or more thermistor wires 106 over a period of up to 120 seconds. The extended measurement period enables the processor 110 to collect comprehensive resistance-time series data that captures the complete thermal response of the PCM 104 to heat input from the one or more thermistor wires 106. The measurement period, as employed herein, provides sufficient time for thermal equilibration and allows the processor 110 to distinguish between different thermal charging states based on characteristic response patterns. The extended measurement capability enables higher accuracy thermal charging state determination by providing more extensive data for analysis algorithms. It may be appreciated that the processor 110 can operate with measurement periods ranging from short-duration measurements of approximately 15 seconds to extended measurements up to 120 seconds, with longer measurement periods providing higher accuracy at the cost of increased measurement time. The extended measurement periods enable collection of larger time series datasets with higher temporal resolution for improved accuracy in thermal charging state determination.

Figure 2:
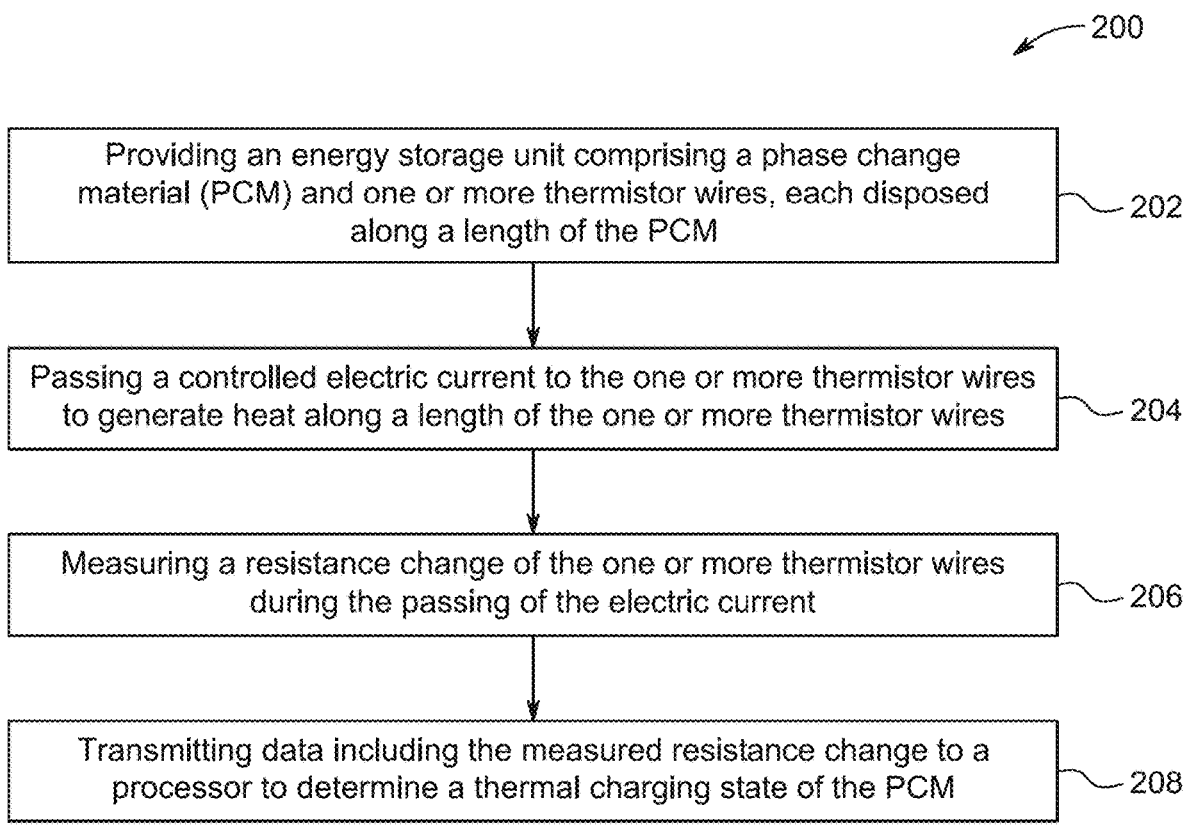
FIG. 2 is a flowchart illustrating a method for measuring thermal charging state in the LHTES system, according to certain embodiments.

Referring now to FIG. 2, illustrated is a flowchart of a method 200 of measuring a thermal charging state in the LHTES system 10. The method 200 provides a systematic approach for determining thermal charging conditions in phase change materials through controlled thermal measurement techniques. The method 200 utilizes resistance-based measurement of the one or more thermistor wires 106 to obtain thermal information about PCM 104 conditions throughout the energy storage unit 102. The method 200 is based on fundamental heat transfer principles including Fourier's Law of Heat Conduction and thermistor temperature-resistance relationships to enable accurate thermal charging state determination.

At step 202, the method 200 includes providing the energy storage unit 102 comprising the PCM 104 and the one or more thermistor wires 106, each disposed along a length of the PCM 104. This establishes the physical configuration required for thermal charging state measurement by positioning the one or more thermistor wires 106 within the PCM 104 domain. The energy storage unit 102 contains the PCM 104 in a controlled environment that enables thermal charging and discharging operations while providing access for the measurement components. The one or more thermistor wires 106 are positioned to traverse the PCM 104 along its length to provide comprehensive spatial coverage for thermal measurement. This configuration ensures that the measurement system is properly integrated with the thermal storage components to enable accurate thermal charging state determination. The one or more thermistor wires 106 are installed with electrical connections to enable current passage and resistance measurement during operation. The physical installation includes securing the one or more thermistor wires 106 within the PCM 104 while maintaining electrical isolation and thermal contact with the surrounding material.

At step 204, the method 200 includes passing a controlled electric current to the one or more thermistor wires 106 to generate heat along a length of the one or more thermistor wires 106. The controlled electric current generates Joule heating within the one or more thermistor wires 106 that provides a known thermal input to the surrounding PCM 104. The current control ensures that the heat generation remains within acceptable levels that enable measurement without significantly disturbing the natural thermal behavior of the PCM 104. The heat generation along the length of the one or more thermistor wires 106 creates thermal gradients in the surrounding PCM 104 that reflect the local thermal properties and phase state conditions. The controlled nature of the current application enables reproducible thermal input for consistent measurement results. The current passing operation implements a heat pulse where a constant power P is applied to the one or more thermistor wires 106, with the power distributed uniformly along the length L according to $$q' = \frac{P}{L}.$$

The heat generation creates a line heat source within the PCM 104 that enables thermal conductivity measurement and thermal charging state determination.

At step 206, the method 200 includes measuring a resistance change of the one or more thermistor wires 106 during the passing of the electric current. The resistance measurement captures the thermal response of the one or more thermistor wires 106 to temperature changes caused by heat generation and interaction with the surrounding PCM 104. The resistance change reflects both the direct heating effect of current passage and the thermal interaction with the PCM 104, providing information about local thermal conditions and thermal properties. The measurement process continuously monitors resistance values to build a time series dataset that characterizes the thermal response of the system. Such measurement of resistance change enables determination of temperature variations along the length of the one or more thermistor wires 106 and assessment of thermal charging state conditions. The resistance change measurements provide the basis for thermal conductivity calculation and thermal charging state determination through analysis of thermal response patterns.

At step 208, the method 200 includes transmitting data including the measured resistance change to the processor 110 to determine a thermal charging state of the PCM 104. The data transmission provides the resistance measurement information to computational systems capable of analyzing the thermal response and extracting thermal charging state information. The processor 110 receives the resistance change data and implements algorithms that correlate the measurements with thermal conditions in the PCM 104. The thermal charging state determination involves processing the resistance change data to identify thermal conditions, phase change progress, and overall charging state of the energy storage unit 102. The data transmission enables real-time monitoring and control of thermal charging operations based on accurate measurement of conditions of the PCM 104. The processor 110 may apply mathematical models and calibration data to convert resistance measurements into quantitative thermal charging state information. The data transmission includes both real-time resistance values and resistance-time series datasets that provide information for thermal analysis and charging state determination.

In present embodiments, the method 200 includes measuring the resistance change as a resistance-time series dataset and computing the thermal charging state using the resistance-time series dataset. The resistance-time series dataset provides temporal information about the thermal response of the PCM 104 to controlled heat input from the one or more thermistor wires 106. The dataset captures the evolution of thermal conditions over time, enabling identification of characteristic patterns associated with different thermal charging states. The computing process analyzes trends and patterns in the resistance-time series dataset to determine phase change progress, thermal distribution, and overall charging state information. The time series approach enables detection of transient thermal phenomena and provides higher accuracy than single-point measurements. The resistance-time series dataset enables correlation of thermal response patterns with PCM 104 conditions and thermal charging states through pattern recognition and mathematical analysis. The dataset provides the basis for calibration and validation of thermal charging state determination algorithms through comparison with known thermal conditions and charging states.

In one or more embodiments, the method 200 includes computing the thermal charging state, wherein computing comprises calculating a temperature (T) of the one or more thermistor wires 106 using a Steinhart-Hart equation based on the measured resistance (R) of the one or more thermistor wires 106, wherein $$\frac{1}{T} = a + b \cdot \ln(R) + c \cdot \ln(R^3)$$

where a, b, and c are thermistor material-specific coefficients. The Steinhart-Hart equation provides a mathematical relationship that converts resistance measurements into accurate temperature values based on the known characteristics of thermistor materials. The temperature calculation enables quantitative assessment of thermal conditions within the PCM 104 and provides the basis for further thermal analysis. The proposed Steinhart-Hart equation implementation accounts for the specific material properties of the thermistor used in the one or more thermistor wires 106 to ensure accurate temperature determination across the operational range. Herein, the material-specific coefficients a, b, and c are determined through calibration procedures that characterize the temperature-resistance relationship of the specific thermistor material. Such temperature calculation provides the foundation for thermal conductivity determination, charging percentage calculation, and overcharge detection through correlation of temperature with thermal properties and phase state conditions of the PCM 104.

In some embodiments, the method 200 further includes calculating a thermal conductivity (k) of the PCM 104 using Fourier's Law of heat conduction, wherein a temperature change (ΔT) is modeled as being proportional to a natural logarithm of elapsed time (ln(t)), as determined from the measured resistance change of the one or more thermistor wires 106. This thermal conductivity calculation analyzes the thermal response of the PCM 104 to controlled heat input to determine thermal transport properties. Fourier's Law provides the theoretical framework for relating heat input, temperature gradients, and thermal conductivity in the measurement configuration. For the line heat source configuration, the temperature rise ΔT at distance r from the heat source after time t is given by:

$$\Delta T(r, t) = \frac{q'}{4\pi k}\ln(t) + C$$

where q' is heat input per unit length, k is thermal conductivity, and C is an integration constant. The natural logarithm relationship captures the characteristic thermal response of materials to line heat sources and enables extraction of thermal conductivity values from temperature-time data using:

$$k = \frac{q'\ln(t)}{4\pi\Delta T}$$

The thermal conductivity information enables assessment of phase state conditions since thermal conductivity differs significantly between solid and liquid phases of phase change materials. The thermal conductivity calculation provides quantitative information about the thermal transport properties of the PCM 104 that correlates with phase state and thermal charging conditions.

In some embodiments, the method 200 further includes computing an overcharged or over-discharged state of the energy storage unit 102 by computing an average phase change material temperature (T) based on a linear relationship between the measured resistance change and temperature of the one or more thermistor wires 106, wherein:

$$T = T_1 + \left(\frac{R - R_1}{R_2 - R_1}\right) \times (T_2 - T_1)$$

where $R_1$ and $R_2$ are resistances at known temperatures $T_1$ and $T_2$, respectively. The overcharged state computation detects conditions where continued thermal input raises the PCM 104 temperature above normal phase change temperatures, indicating sensible heat storage in the liquid phase. The over-discharged state computation detects conditions where continued thermal extraction lowers temperature of the PCM 104 below normal phase change temperatures, indicating sensible heat removal from the solid phase. Such linear relationship enables accurate temperature calculation from resistance measurements for quantifying the extent of overcharged or over-discharged conditions. Herein, the temperature calculation uses calibration data with known resistance-temperature relationships to provide accurate temperature determination across the operational range. The overcharge and over-discharge detection enables monitoring of thermal energy storage beyond the latent heat capacity associated with phase change transitions. This linear interpolation approach provides computational efficiency while maintaining accuracy for temperature determination within the calibrated range.

In some embodiments, the method 200 further includes estimating a stored sensible heat in the PCM 104 using a specific heat formula:

$$Q = m \cdot C_p \cdot (T - T_m)$$

where Q is the heat added, m is a mass of the PCM, $C_p$ is a specific heat capacity of a liquid PCM, T is an average PCM temperature, and $T_m$ is a melting temperature of the PCM 104. The sensible heat estimation quantifies thermal energy content associated with temperature changes beyond the latent heat storage capacity of phase change transitions. The given specific heat formula relates temperature changes to sensible heat content using known thermal properties of the PCM 104, including specific heat capacity and mass. The sensible heat estimation enables complete thermal energy accounting for the energy storage unit 102, including both latent heat and sensible heat contributions. The estimation provides information about thermal energy storage during overcharged and over-discharged conditions where phase change is complete. The sensible heat calculation accounts for thermal energy storage in both liquid and solid phases when the PCM 104 operates at temperatures above or below the melting temperature. This calculation provides quantitative information about additional thermal energy storage capacity beyond the primary latent heat storage mechanism.

In some embodiments, the method 200 further includes computing a charging percentage (P) of the energy storage unit 102 using a comparison of the measured resistance change with a plurality of stored reference resistance change values for a solid and a liquid phase change material states. The charging percentage computation provides a quantitative measure of thermal charging progress expressed as a percentage of total charging capacity. The comparison process evaluates current resistance measurements against calibrated reference values corresponding to fully solid and fully liquid states of the PCM 104. The stored reference values provide calibration standards that account for the specific thermal and electrical properties of the measurement system and phase change material combination. For present purposes, the charging percentage calculation uses the relationship:

$$P = \left|\frac{\Delta R_{measured} - \Delta R_{solid}}{\Delta R_{liquid} - \Delta R_{solid}}\right| \times 100$$

where the reference resistance changes for solid and liquid states are determined through calibration measurements. The charging percentage enables monitoring and control of thermal charging operations based on quantitative assessment of charging progress. The calculation provides accuracy of approximately 10% for charging state determination based on the thermal conductivity differences between solid and liquid phases of the PCM 104.

In some embodiments, the method 200 further includes computing the thermal charging state based on a stored dataset of experimental resistance-time values for calibration. Such experimental dataset provides empirical calibration information that enhances the accuracy of thermal charging state determination beyond theoretical calculations alone. The stored dataset includes resistance-time measurements collected during controlled charging and discharging experiments with known thermal conditions and charging states. The calibration approach uses experimental data to refine theoretical relationships and account for system-specific effects that may not be captured in analytical models. The dataset-based computation enables improved accuracy and reliability in thermal charging state determination for practical applications. The experimental calibration data includes measurements for fully charged, fully discharged, and intermediate charging states to provide comprehensive reference information. The stored dataset enables accuracy refinement with target error margins of approximately 5% through correlation of measured data with known thermal conditions and charging states.

The device 100 and the method 200 of the present disclosure for measuring a thermal charging state provide a significant contribution by enabling a more accurate and reliable determination of the energy stored in LHTES systems. The use of one or more continuous thermistor wires to obtain an integrated measurement across the entire volume of the PCM 104 overcomes the limitations of traditional discrete sensor arrays, which can fail to capture the non-uniform nature of phase transitions. This integrated approach ensures that the determined charging state is a true reflection of the overall system condition, rather than an estimate based on a few localized points.

The configuration of the device 100 provides distinct advantages. By passing a controlled electric current through the one or more thermistor wires 106, the device actively probes the thermal environment of the phase change material. The processor 110 analyzes the resulting resistance-time series dataset to determine not only temperature but also the thermal conductivity of the PCM 104, a direct indicator of its phase. This allows the device 100 to accurately compute a charging percentage, identify overcharged or over-discharged states, and estimate stored sensible heat. The proposed method 200, using the device 100, is more direct and less susceptible to the ambiguities that affect temperature-only based systems, especially in the critical mushy zone where both solid and liquid phases are present.

Figure 3:
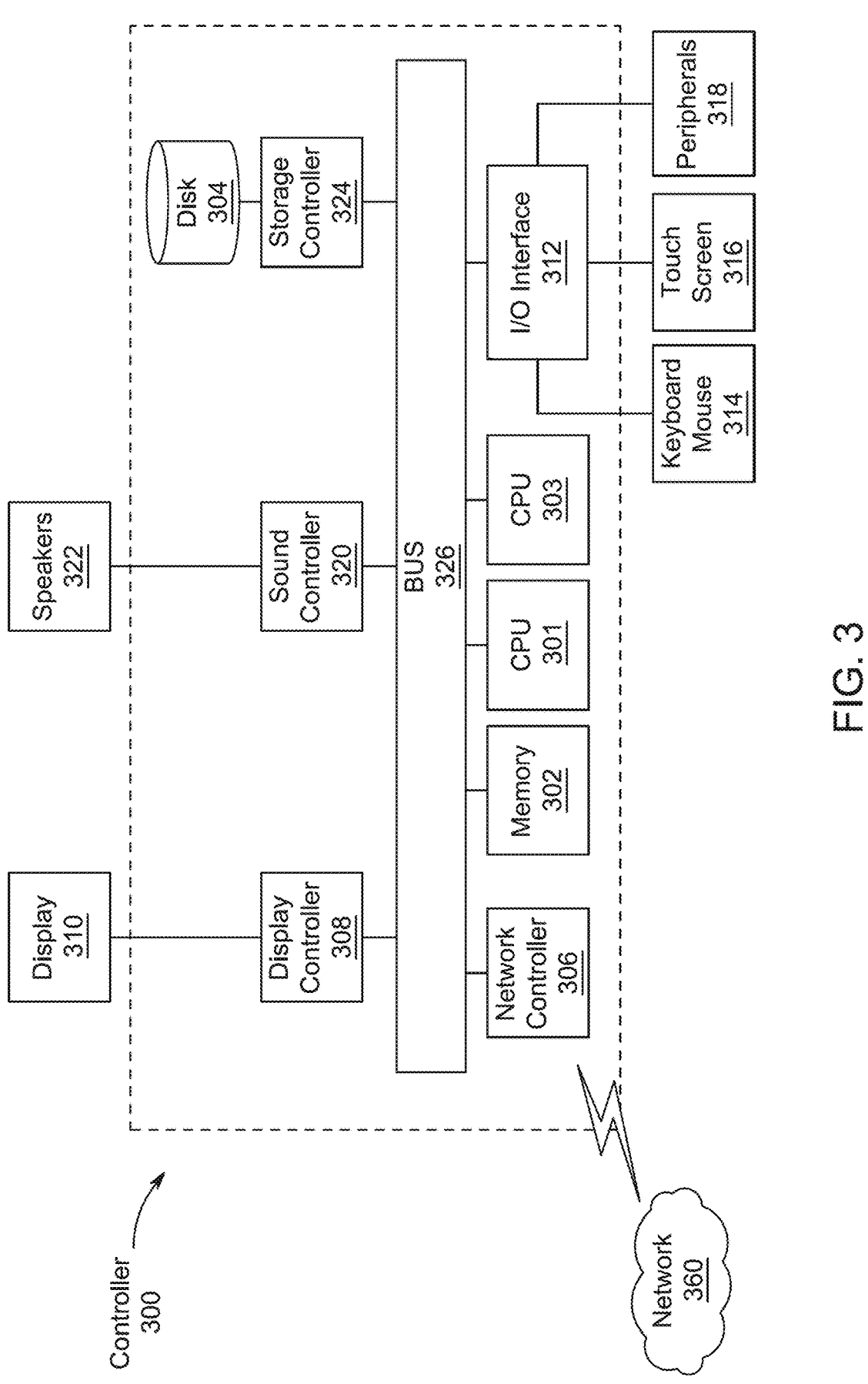
FIG. 3 is an illustration of a non-limiting example of details of computing hardware used in a computing system, according to certain embodiments.

Next, further details of the hardware description of the computing environment according to exemplary embodiments is described with reference to FIG. 3. In FIG. 3, a controller 300 is described embodying the computing hardware of the unmanned aquatic vehicle 60 of the present disclosure, in which the controller is a computing device which includes a CPU 301 which performs the processes described above/below. The process data and instructions may be stored in memory 302. These processes and instructions may also be stored on a storage medium disk 304 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 301, 303 and an operating system such as Microsoft Windows 7, Microsoft Windows 8, Microsoft Windows 10, UNIX, Solaris, LINUX, Apple MAC-OS and other systems known to those skilled in the art.

The hardware elements in order to achieve the computing device may be realized by various circuitry elements, known to those skilled in the art. For example, CPU 301 or CPU 303 may be a Xenon or Core processor from Intel of America or an Opteron processor from AMD of America, or may be other processor types that would be recognized by one of ordinary skill in the art. Alternatively, the CPU 301, 303 may be implemented on an FPGA, ASIC, PLD or using discrete logic circuits, as one of ordinary skill in the art would recognize. Further, CPU 301, 303 may be implemented as multiple processors cooperatively working in parallel to perform the instructions of the inventive processes described above.

The computing device in FIG. 3 also includes a network controller 306, such as an Intel Ethernet PRO network interface card from Intel Corporation of America, for interfacing with network 360. As can be appreciated, the network 360 can be a public network, such as the Internet, or a private network such as an LAN or WAN network, or any combination thereof and can also include PSTN or ISDN sub-networks. The network 360 can also be wired, such as an Ethernet network, or can be wireless such as a cellular network including EDGE, 3G, 4G and 5G wireless cellular systems. The wireless network can also be WiFi, Bluetooth, or any other wireless form of communication that is known.

The computing device further includes a display controller 308, such as a NVIDIA GeForce GTX or Quadro graphics adaptor from NVIDIA Corporation of America for interfacing with display 310, such as a Hewlett Packard HPL2445w LCD monitor. A general purpose I/O interface 312 interfaces with a keyboard and/or mouse 314 as well as a touch screen panel 316 on or separate from display 310. General purpose I/O interface also connects to a variety of peripherals 318 including printers and scanners, such as an OfficeJet or DeskJet from Hewlett Packard.

A sound controller 320 is also provided in the computing device such as Sound Blaster X-Fi Titanium from Creative, to interface with speakers/microphone 322 thereby providing sounds and/or music.

The general purpose storage controller 324 connects the storage medium disk 304 with communication bus 326, which may be an ISA, EISA, VESA, PCI, or similar, for interconnecting all of the components of the computing device. A description of the general features and functionality of the display 310, keyboard and/or mouse 314, as well as the display controller 308, storage controller 324, network controller 306, sound controller 320, and general purpose I/O interface 312 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 4.

Figure 4:
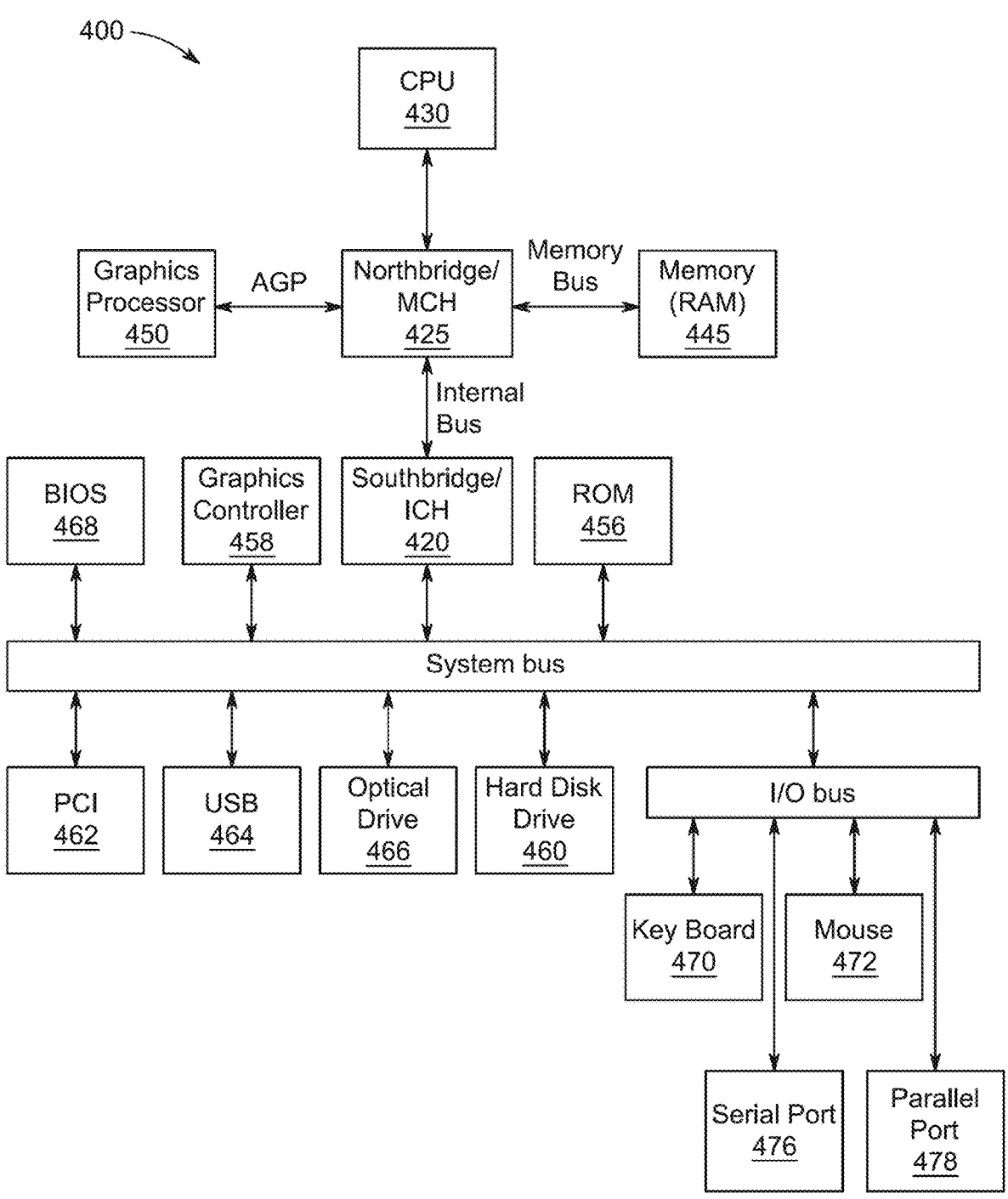
FIG. 4 is an exemplary schematic diagram of a data processing system used within the computing system, according to certain embodiments.

FIG. 4 shows a schematic diagram of a data processing system, according to certain embodiments, for performing the functions of the exemplary embodiments. The data processing system is an example of a computer in which code or instructions implementing the processes of the illustrative embodiments may be located.

In FIG. 4, data processing system 400 employs a hub architecture including a north bridge and memory controller hub (NB/MCH) 425 and a south bridge and input/output (I/O) controller hub (SB/ICH) 420. The central processing unit (CPU) 430 is connected to NB/MCH 425. The NB/MCH 425 also connects to the memory 445 via a memory bus, and connects to the graphics processor 450 via an accelerated graphics port (AGP). The NB/MCH 425 also connects to the SB/ICH 420 via an internal bus (e.g., a unified media interface or a direct media interface). The CPU Processing unit 430 may contain one or more processors and even may be implemented using one or more heterogeneous processor systems.

Figure 5:
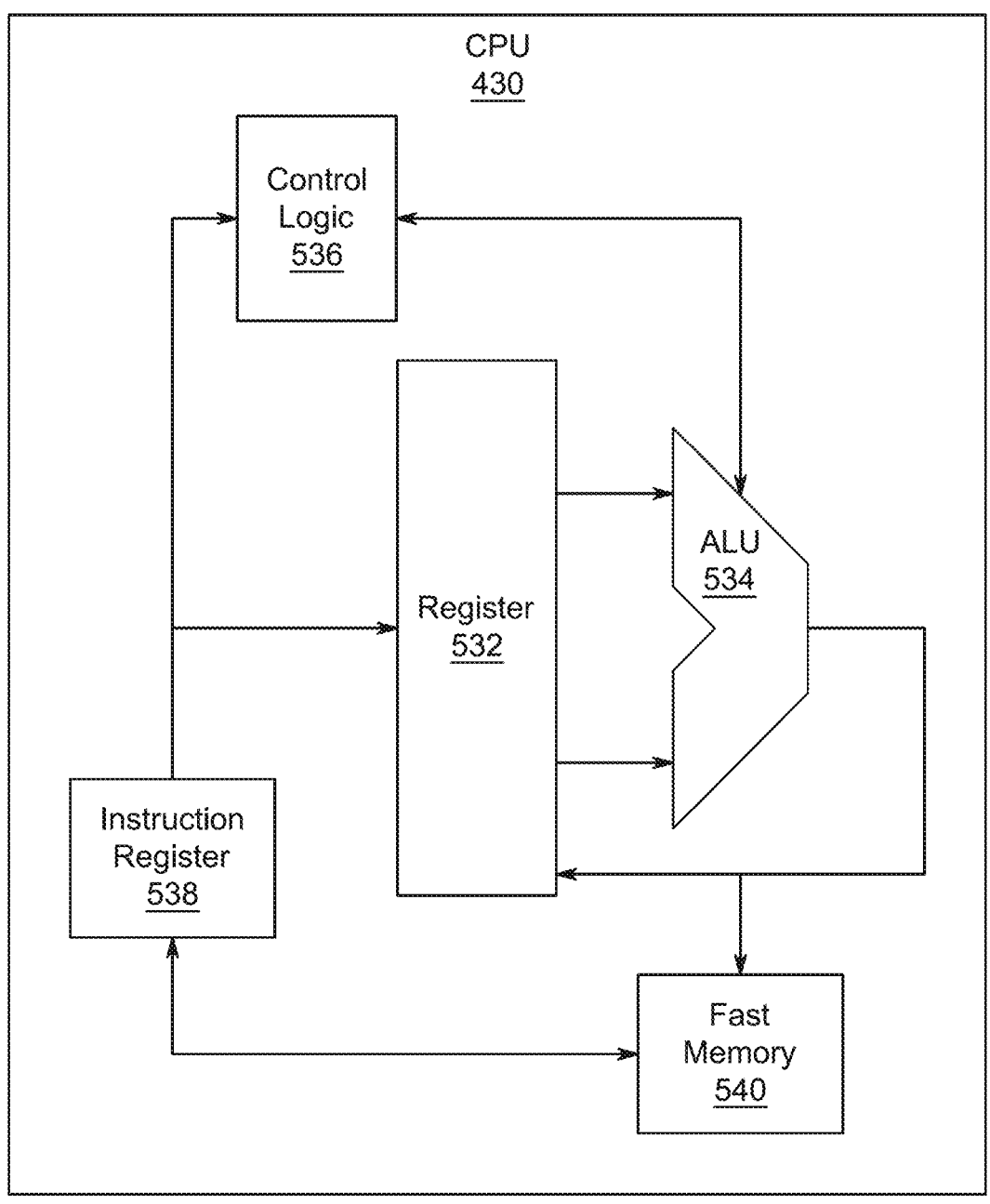
FIG. 5 is an exemplary schematic diagram of a processor used with the computing system, according to certain embodiments.

For example, FIG. 5 shows one implementation of CPU 430. In one implementation, the instruction register 538 retrieves instructions from the fast memory 540. At least part of these instructions are fetched from the instruction register 538 by the control logic 536 and interpreted according to the instruction set architecture of the CPU 430. Part of the instructions can also be directed to the register 532. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 534 that loads values from the register 532 and performs logical and mathematical operations on the loaded values according to the instructions. The results from these operations can be feedback into the register and/or stored in the fast memory 540. According to certain implementations, the instruction set architecture of the CPU 430 can use a reduced instruction set architecture, a complex instruction set architecture, a vector processor architecture, a very large instruction word architecture. Furthermore, the CPU 430 can be based on the Von Neuman model or the Harvard model. The CPU 430 can be a digital signal processor, an FPGA, an ASIC, a PLA, a PLD, or a CPLD. Further, the CPU 430 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 4, the data processing system 400 can include that the SB/ICH 420 is coupled through a system bus to an I/O Bus, a read only memory (ROM) 456, universal serial bus (USB) port 464, a flash binary input/output system (BIOS) 468, and a graphics controller 458. PCI/PCIe devices can also be coupled to SB/ICH 488 through a PCI bus 462.

The PCI devices may include, for example, Ethernet adapters, add-in cards, and PC cards for notebook computers. The Hard disk drive 460 and CD-ROM 466 can use, for example, an integrated drive electronics (IDE) or serial advanced technology attachment (SATA) interface. In one implementation the I/O bus can include a super I/O (SIO) device.

Further, the hard disk drive (HDD) 460 and optical drive 466 can also be coupled to the SB/ICH 420 through a system bus. In one implementation, a keyboard 470, a mouse 472, a parallel port 478, and a serial port 476 can be connected to the system bus through the I/O bus. Other peripherals and devices that can be connected to the SB/ICH 420 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry or based on the requirements of the intended back-up load to be powered.

Figure 6:
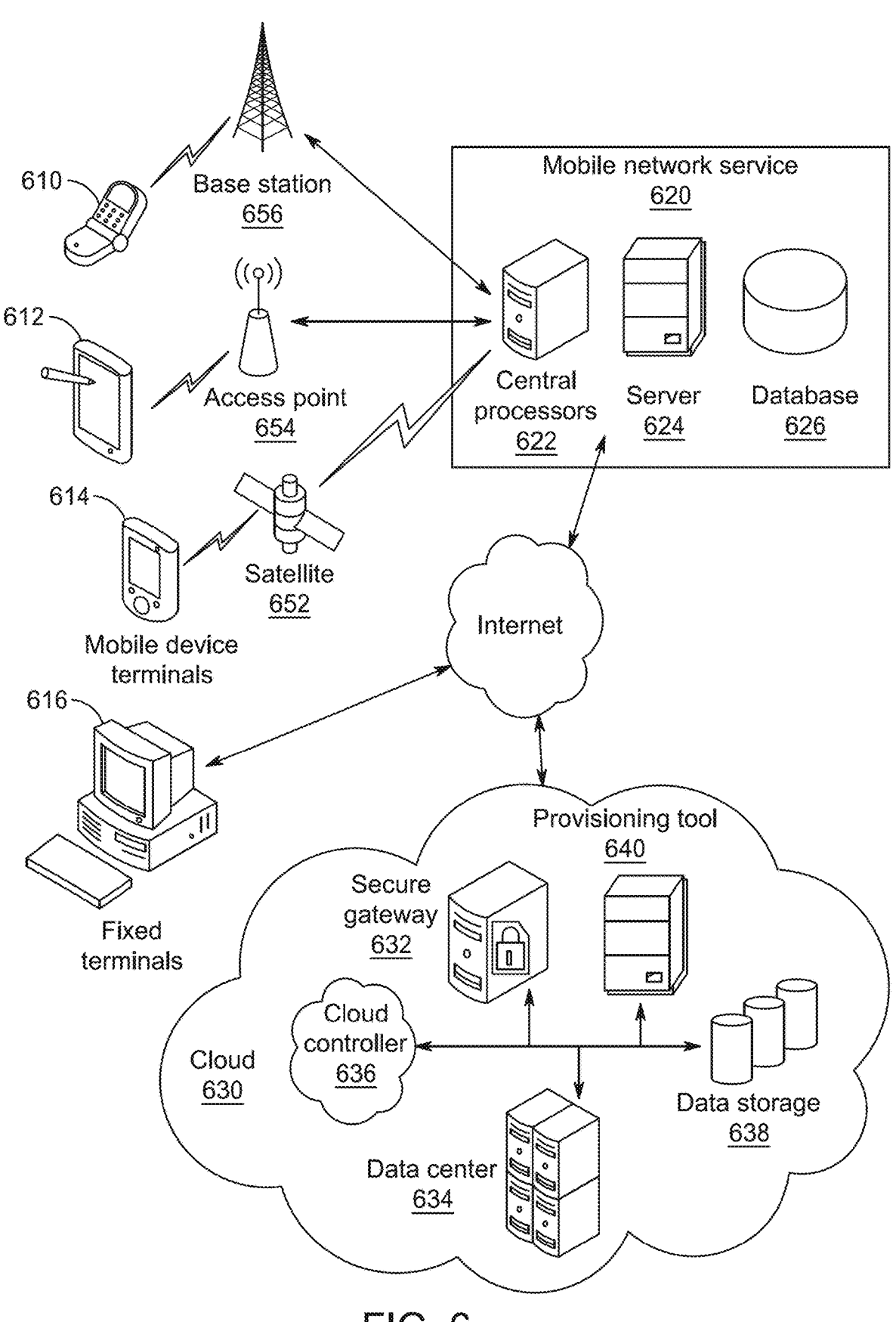
FIG. 6 is an illustration of a non-limiting example of distributed components which may share processing with a controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, such as cloud 630 including a cloud controller 636, a secure gateway 632, a data center 634, data storage 638 and a provisioning tool 640, and mobile network services 620 including central processors 622, a server 624 and a database 626, which may share processing, as shown by FIG. 6, in addition to various human interface and communication devices (e.g., display monitors 616, smart phones 610, tablets 612, personal digital assistants (PDAs) 614). The network may be a private network, such as a LAN, satellite 652 or WAN 654, or be a public network, may such as the Internet. Input to the system may be received via direct user input and received remotely in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Numerous modifications and variations of the present disclosure are possible in light of the above teachings. It is therefore to be understood that within the scope of the appended claims, the invention may be practiced otherwise than as specifically described herein.

The invention claimed is:

1. A device for measuring a thermal charging state in a latent heat thermal energy storage (LHTES) system comprising:
    an energy storage unit comprising a phase change material (PCM);
    one or more thermistor wires, each disposed along a length of the PCM;
    a control circuit electrically connected to the one or more thermistor wires to pass an electric current to the one or more thermistor wires and measure a resistance change of the one or more thermistor wires during passage of the electric current; and
    a processor in communication with the control circuit configured to determine a thermal charging state of the PCM based on at least the measured resistance change of the one or more thermistor wires.

2. The device of claim 1, wherein the resistance change is measured as a resistance-time series dataset, and the processor is further configured to determine the thermal charging state using the resistance-time series dataset.

3. The device of claim 1, wherein the processor is configured to compute the thermal charging state of the PCM by analyzing a relationship between the measured resistance change and a temperature of the one or more thermistor wires using a thermistor calibration equation.

4. The device of claim 1, wherein the processor is configured to compute the thermal charging state of the PCM using a Steinhart-Hart equation:

$$\frac{1}{T} = a + b \cdot \ln(R) + c \cdot \ln(R^3)$$

where T is a temperature determined from a resistance R of the one or more thermistor wires, and
a, b, and c are thermistor material-specific coefficients.

5. The device of claim 1, wherein the processor is configured to estimate a thermal conductivity of the PCM based on the measured resistance change of the one or more thermistor wires over a selected time and a corresponding temperature change.

6. The device of claim 1, wherein the processor is configured to compute a charging percentage of the energy storage unit by comparing the measured resistance change to a plurality of stored reference resistance change values for a solid and a liquid PCM state.

7. The device of claim 1, wherein the processor is configured to compute an overcharged or over-discharged state of the energy storage unit by computing an average PCM temperature based on a linear relationship between the measured resistance change and a temperature of the one or more thermistor wires.

8. The device of claim 1, wherein the processor is configured to estimate a stored sensible heat in the PCM based on a temperature of the one or more thermistor wires and one or more PCM properties.

9. The device of claim 1, further comprising a pair of conductive rings provided at opposite ends of the PCM,
    wherein the one or more thermistor wires is linearly connected between the pair of conductive rings.

10. The device of claim 1, wherein the one or more thermistor wires has a diameter between 1 mm and 2 mm.

11. The device of claim 1, wherein the control circuit is configured to pass an electric current of less than 1A through the one or more thermistor wires to generate heat.

12. The device of claim 1, wherein the processor is configured to compute the thermal charging state of the PCM by analyzing a relationship between the measured resistance change and temperature of the one or more thermistor wires over a period of up to 120 seconds.

13. A method of measuring a thermal charging state in a latent heat thermal energy storage (LHTES) system comprising:
    providing an energy storage unit comprising a phase change material (PCM) and one or more thermistor wires, each disposed along a length of the PCM;
    passing a controlled electric current to the one or more thermistor wires to generate heat along a length of the one or more thermistor wires;
    measuring a resistance change of the one or more thermistor wires during the passing of the electric current; and
    transmitting data including the measured resistance change to a processor to determine a thermal charging state of the PCM.

14. The method of claim 13, further comprising measuring the resistance change as a resistance-time series dataset and computing the thermal charging state using the resistance-time series dataset.

15. The method of claim 13, wherein computing the thermal charging state comprises calculating a temperature (T) of the one or more thermistors wires using a Steinhart-Hart equation based on the measured resistance (R) of the one or more thermistor wires, wherein $$\frac{1}{T} = a + b \cdot \ln(R) + c \cdot \ln(R^3)$$

where a, b, and c are thermistor material-specific coefficients.

16. The method of claim 13, further comprising calculating a thermal conductivity (k) of the PCM using Fourier's Law of heat conduction, wherein a temperature change ($\Delta T$) is modeled as being proportional to a natural logarithm of elapsed time ($\ln(t)$), as determined from the measured resistance change of the one or more thermistor wires.

17. The method of claim 13, further comprising computing an overcharged or over-discharged state of the energy storage unit by computing an average PCM temperature (T) based on a linear relationship between the measured resistance change and temperature of the one or more thermistor wires, wherein:

$$T = T_1 + \left(\frac{R - R_1}{R_2 - R_1}\right) \times (T_2 - T_1)$$

where $R_1$ and $R_2$ are resistances at known temperatures $T_1$ and $T_2$, respectively.

18. The method of claim 13, further comprising estimating a stored sensible heat in the PCM using a specific heat formula:

$$Q = m \cdot C_p \cdot (T - T_m)$$

where Q is the heat added, m is a mass of the PCM, $C_p$ is a specific heat capacity of a liquid PCM, T is an average PCM temperature, and $T_m$ is a melting temperature of the PCM.

19. The method of claim 13, further comprising computing a charging percentage (P) of the energy storage unit using a comparison of the measured resistance change with a plurality of stored reference resistance change values for a solid and a liquid PCM states.

20. The method of claim 13, further computing the thermal charging state based on a stored dataset of experimental resistance-time values for calibration.

* * * * *